L. L. GOHEEN.
MATERIAL SAVING DEVICE.
APPLICATION FILED JULY 5, 1921.
1,429,282.
Patented Sept. 19, 1922.
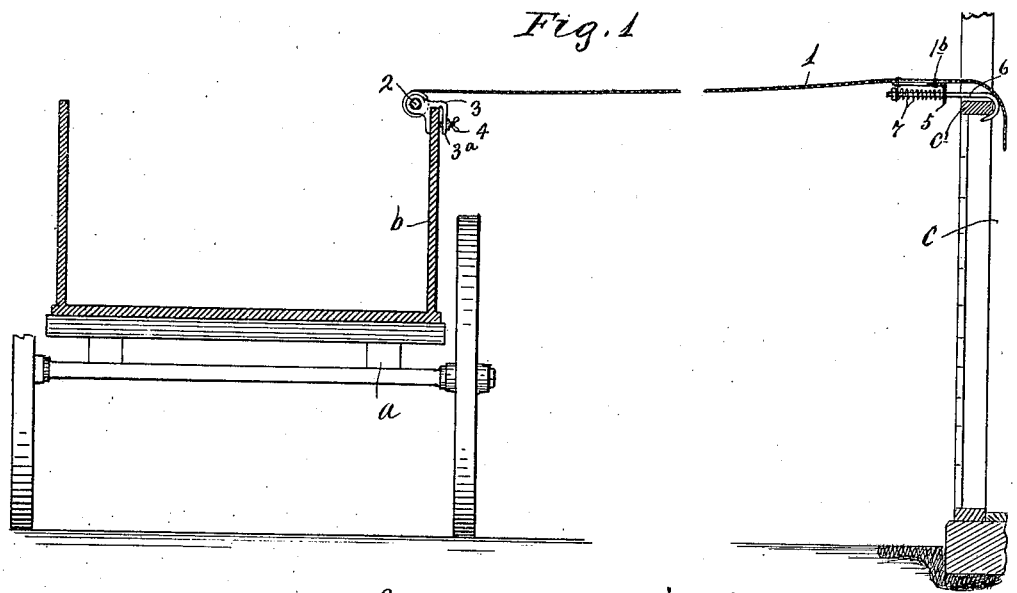
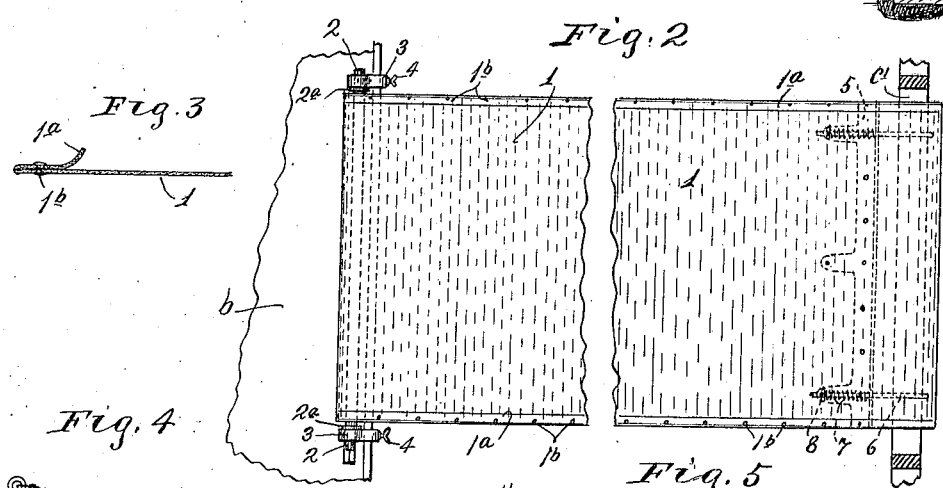
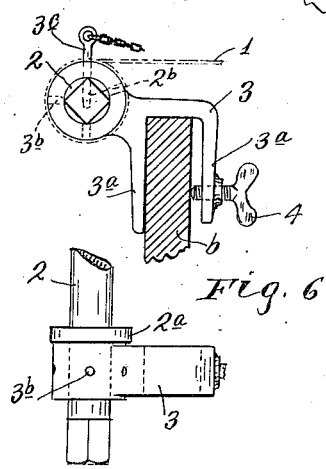
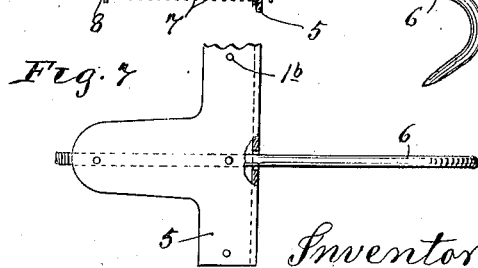
Inventor.
Leonard L. Goheen.
By his Attorney
James F. Williamson Patented Sept. 19, 1922.

1,429,282

UNITED STATES PATENT OFFICE.

LEONARD L GOHEEN, OF SHERWOOD, NORTH DAKOTA.

MATERIAL-SAVING DEVICE.

Application filed July 5, 1921. Serial No. 482,408.

*To all whom it may concern:*

Be it known that I, LEONARD L GOHEEN, a citizen of the United States, residing at Sherwood, in the county of Renville and State of North Dakota, have invented certain new and useful Improvements in Material-Saving Devices; and I do hereby declare the following to be a full, clear, and exact description of the invention, such as will enable others skilled in the art to which it appertains to make and use the same.

This invention relates to a catch apron or a material receiving device particularly designed to be used where material is shoveled from one receptacle into another.

It is well known that in the operation of shoveling, grain or other material from a wagon into a bin, that no matter how careful the operator is, considerable grain will drop from the shovel onto the ground and become mixed with the dirt and dust.

It is an object of this invention to provide a device, the use of which will prevent this loss of grain or other material.

It is a further object of the invention to provide such a device in the form of a flexible apron having detachable means at the ends by which it is readily connected to the wagon and the storage receptacle.

It is a still further object of the invention to provide the apron with a roller take-up device and to yieldingly connect the same at one end to the wagon or bin.

These and other objects and advantages of the invention will be fully set forth in the following description made in connection with the accompanying drawings in which like reference characters refer to the same parts throughout the different views, and in which, Fig. 1 is a view showing the device as applied to a wagon and storage bin;

Fig. 2 is a top plan view of the device showing parts of the wagon and bin;

Fig. 3 is a partial transverse section of the device;

Fig. 4 is a view on an enlarged scale of the attaching means at one end of the apron;

Fig. 5 is a view partially in section showing the attaching means at the other end of the apron;

Fig. 6 is a top plan view of Fig. 4; and

Fig. 7 is a top plan view of Fig. 5.

Referring to the drawings in Fig. 1, a wagon is shown comprising a wheeled truck $a$ and a body $b$, the latter being shown in section. A storage bin designated $c$ is shown which is provided with the usual door through which the material is discharged therein, at the bottom of which is shown a sill $c^1$. The apron 1 is shown as disposed between the side of the body $b$ of the wagon and the sill $c^1$ of the bin. The apron 1 is made of heavy canvas or other suitable flexible fabric material and is inturned at its edges to form flaps $1^a$, and closely adjacent rivets $1^b$, or other reinforcing means, are disposed along the edge to hold flap $1^a$ in position. It will be noted that the flap extends some distance inwardly of the securing and reinforcing means $1^b$ and is normally turned up, as shown in Fig. 3. The roller, at one end, is attached to a rod 2 rotatably mounted in brackets 3, said rod having one end projecting beyond one of said brackets and angularly formed to receive a crank or other member for turning the same and rolling up the apron. The rod 2 is also provided with collars $2^a$ adjacent the inside of the brackets 3 to hold the same against longitudinal movement. The brackets 3 are formed with spaced arms $3^a$ adapted to span the side of the wagon or other receptacle and a set screw 4 passes through one of said arms and a boss formed thereon and is adapted to clamp the bracket to the side of the wagon. The bearing portion of the brackets 3 is formed with a plurality of holes $3^b$ and a hole $2^b$ is also formed in the rod 2 adapted to be alined with said holes. A pin $3^c$ is provided which will be attached by a chain or other member to some part of the device, and when inserted through the holes $3^b$ into the hole $2^b$, will hold the rod 2 against rotation.

This apron 1 has attached at one side thereof and some distance from its other end, an angular member 5 extending thereacross, one side of which is equipped with projecting tongues and is riveted or otherwise suitably secured to the body of the apron. The member 5 is apertured at a point adjacent to each side of the apron and hook members 6 having straight shanks, are disposed in said apertures and have thereon coiled springs 7 disposed between the downwardly projecting side of the angle member 5 and nut collars 8 threaded onto the end of said shanks.

In use, the device is disposed, as shown in Fig. 1. The brackets 3 are clamped to the side of the wagon or other receptacle with the rod 2 and the rolled curtain thereon disposed upwardly. The hooks 6 are then engaged over the edge or sill of the bin and the loose end of the curtain hangs over these hooks and down over the side of the bin. As the grain or other material is now shoveled from the wagon and thrown into the bin, any of the same which drops off the shovel will be caught by the apron. As there is usually a difference in elevation between the side of the wagon and bin so that the apron slopes one way or the other, the grain will slide down the same as it accumulates thereon and be discharged into either the wagon or the bin and thus saved. The grain will be prevented from passing over the sides of the apron by the flaps $1^a$.

The apron can be rolled up to the desired tension, and held in this position by insertion of the pin $3^c$.

If any stress should be placed on the apron while the same is in use, as would be occasioned by the starting of the team hitched to the wagon, the springs 7 would be compressed and danger of tearing the apron eliminated.

From the above description it is seen that applicant has provided a very efficient device, the use of which will effect a great saving in grain or other material handled. The device is simple and can be easily and inexpensively made and the efficiency and utility thereof have been demonstrated in actual practice.

It will, of course, be understood that various changes may be made in the form, details and arrangement of the device without departing from the scope of applicant's invention, which generally stated, consists in the matter shown and described and set forth in the appended claims.

What is claimed is:

1. A material saving device comprising a flexible fabric apron, means in one end thereof for detachably connecting the same to a receptacle, means at the other end thereof for resiliently and detachably connecting the apron to the side of a storage receptacle.

2. A material saving device comprising a flexible fabric apron, means in one end thereof for connecting the same to a receptacle, means at the other end thereof resiliently connected to the apron for detachably engaging the side of a storage receptacle.

3. A material saving device comprising a flexible fabric apron, means at one end thereof for connecting the same to the side of a receptacle, and means beneath said apron at the other end thereof resiliently connected thereto adapted to engage over the side of a storage receptacle, said apron extending over said means and into said receptacle.

4. A material saving device comprising a fabric apron, means at one end thereof for connecting the same to the side of a receptacle, and spaced hooks adjacent the other end thereof resiliently connected to said apron and adapted to engage over the side of the storage receptacle.

5. A material saving device comprising a a fabric apron, means at one end thereof adapted to be connected to the side of a receptacle, an angle member secured adjacent to the other end of the apron and extending thereacross having one side projecting downwardly, spaced hooks passing through said angle member, nut collars threaded on the ends of said hooks, and springs carried on said hook members between said nut collars and said angle members, said hooks being adapted to engage over the side of a storage receptacle and the end of said apron being extended beyond said hooks.

6. The structure set forth in claim 5, said apron being provided with inwardly directed flaps at its sides, whereby the material is prevented from discharging thereover.

In testimony whereof I affix my signature in presence of two witnesses.

LEONARD L GOHEEN.

Witnesses:
 PERRY BROWN,
 H. C. NONDBERG.